(12) United States Patent
Lamb et al.

(10) Patent No.: US 9,845,824 B2
(45) Date of Patent: Dec. 19, 2017

(54) MOUNTING DEVICE FOR A PHOTOVOLTAIC MODULE

(71) Applicant: First Solar, Inc., Perrysburg, OH (US)

(72) Inventors: Jeffrey Lamb, Perrysburg, OH (US); Matthew Schneider, Perrysburg, OH (US); Bart Wiktorowicz, Perrysburg, OH (US)

(73) Assignee: FIRST SOLAR, INC., Perrysburg, OH (US)

( * ) Notice: Subject to any disclaimer, the term of this patent is extended or adjusted under 35 U.S.C. 154(b) by 130 days.

(21) Appl. No.: 14/929,959

(22) Filed: Nov. 2, 2015

(65) Prior Publication Data

US 2016/0123383 A1    May 5, 2016

Related U.S. Application Data

(60) Provisional application No. 62/074,145, filed on Nov. 3, 2014.

(51) Int. Cl.
| | |
|---|---|
| *F16C 17/02* | (2006.01) |
| *G01S 3/78* | (2006.01) |
| *F16C 33/06* | (2006.01) |
| *G01S 3/786* | (2006.01) |

(52) U.S. Cl.
CPC .............. *F16C 17/02* (2013.01); *F16C 33/06* (2013.01); *F16C 2204/20* (2013.01); *G01S 3/7861* (2013.01)

(58) Field of Classification Search
CPC .. F16J 2/541; F16J 2/5232; F16J 2/526; F16J 2/5264; F16J 2002/5451; F16J 2002/5468; F16J 2002/5482; F16C 17/02; F16C 17/12; F16M 11/18; Y02E 10/47; F24J 2/541; F24J 2/5232; F24J 2/526; F24J 2/5264; F24J 2002/5451; F24J 2002/5468; F24J 2002/5482; G01S 3/7861

See application file for complete search history.

(56) References Cited

U.S. PATENT DOCUMENTS

| | | | | |
|---|---|---|---|---|
| 4,832,002 A | * | 5/1989 | Medina | ....................... F24J 2/16 126/577 |
| 5,402,140 A | * | 3/1995 | Rodeffer | ................ H01Q 1/125 248/232 |
| 7,676,977 B1 | * | 3/2010 | Cahill | ................... F16M 11/16 248/168 |

(Continued)

FOREIGN PATENT DOCUMENTS

WO        2012058899 A1    5/2012

*Primary Examiner* — Alan B Waits
(74) *Attorney, Agent, or Firm* — Michael E. Dockins; Shumaker, Loop & Kendrick, LLP

(57) ABSTRACT

A bearing inner race for a solar panel tracker positioning system includes a semi-circular shaped body having a first upper land and an oppositely facing second upper land. A first elongated aperture is positioned proximate to the first upper land and a second elongated aperture is positioned proximate to the second upper land. A first alignment ring is centered within the first elongated through aperture and a second alignment ring is centered within the second elongated through aperture. The bearing inner race also includes a ground stud integrally connected to the body in an as-cast condition of the body.

12 Claims, 6 Drawing Sheets

(56) References Cited

U.S. PATENT DOCUMENTS

| | | | |
|---|---|---|---|
| 8,748,733 B2* | 6/2014 | Leary | F24J 2/5239 |
| | | | 136/251 |
| 9,035,168 B2* | 5/2015 | Barton | H02S 20/00 |
| | | | 136/246 |
| 9,206,999 B2* | 12/2015 | Reed | F24J 2/5264 |
| 9,303,684 B2* | 4/2016 | Clavijo Lumbreras | F16C 11/0695 |
| 9,466,749 B1* | 10/2016 | Au | H01L 31/0522 |
| 9,611,652 B2* | 4/2017 | Haddock | E04F 13/0842 |
| 2010/0307991 A1 | 12/2010 | Belikoff et al. | |
| 2011/0060475 A1 | 3/2011 | Baldwin et al. | |
| 2011/0253195 A1* | 10/2011 | Kim | F24J 2/541 |
| | | | 136/246 |
| 2012/0180845 A1 | 7/2012 | Cole et al. | |
| 2013/0039610 A1 | 2/2013 | Schneider et al. | |
| 2013/0180568 A1 | 7/2013 | Hartelius | |
| 2013/0200234 A1 | 8/2013 | Zhao et al. | |
| 2014/0182654 A1 | 7/2014 | Agullo | |
| 2014/0202524 A1 | 7/2014 | Belikoff et al. | |
| 2014/0311552 A1* | 10/2014 | Garrett | H02S 20/24 |
| | | | 136/251 |
| 2015/0207452 A1* | 7/2015 | Werner | F24J 2/16 |
| | | | 136/246 |
| 2015/0270027 A1* | 9/2015 | Schrock | H01B 5/06 |
| | | | 52/173.3 |
| 2016/0218663 A1* | 7/2016 | Werner | H02S 20/10 |
| 2017/0102168 A1* | 4/2017 | Childress | F24J 2/541 |

* cited by examiner

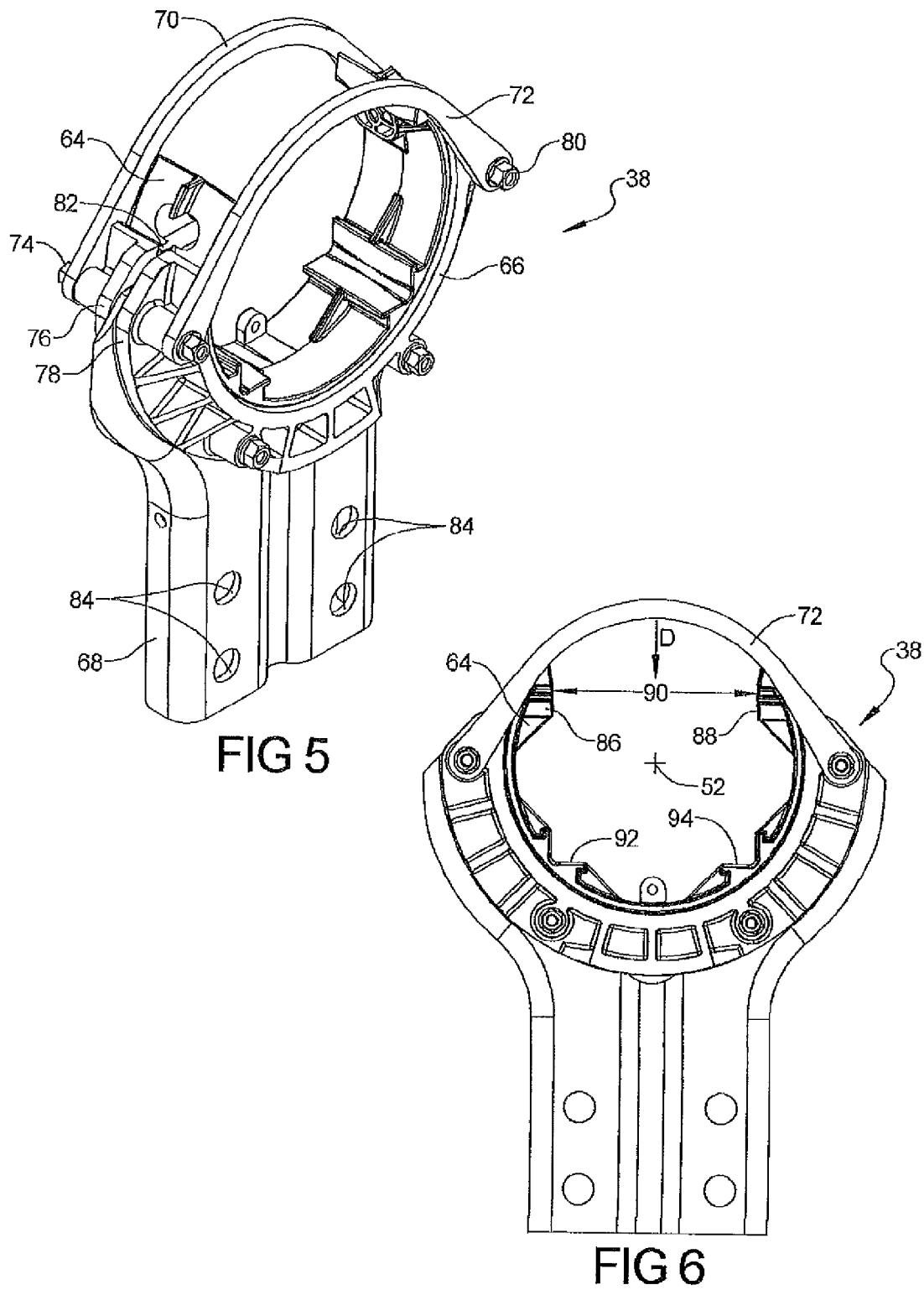

MOUNTING DEVICE FOR A PHOTOVOLTAIC MODULE

CROSS-REFERENCE TO RELATED APPLICATION

This application claims the benefit of priority of U.S. Provisional Patent Application Ser. No. 62/074,145 filed on Nov. 3, 2014 hereby incorporated herein by reference in its entirety.

FIELD

The present disclosure relates to solar panel arrays and more specifically to devices and methods for connecting solar panel arrays to array positioning systems.

BACKGROUND

Solar energy produced by the sun can be captured by photovoltaic (PV) modules. Mounting systems for PV modules can be fixed or can track the sun's diurnal motion. Typical single axis tracking systems include one or more torque tubes positioned approximately five feet above ground level or grade, which are connected to and are capable of rotating a group of PV modules. The torque tubes are supported on multiple support posts or piles such as driven posts, drilled concrete piles or ballasted foundations. The torque tubes support one or more PV module support structures collectively defining a solar panel tracker positioning system (or solar panel tracker). PV module power plants typically have hundreds or thousands of solar panel trackers with multiple rows of PV modules, each rotated to track the sun's diurnal motion. A connecting apparatus is therefore required to permit the torque tubes to rotate with respect to each of the support piles.

The orientation of each panel and of the solar panel array in general with respect to the sun during daylight conditions can be controlled by an electric motor which is connected to and rotates the torque tube connected to the PV panels. An actuator arm mount translates axial displacement of a drive shaft connected to the electric motor to the rotational motion necessary for rotation of the solar panel tracker. Known bearing races are used to connect the support piles to the torque tubes. Known bearing races have multiple component parts which render the bearing race and the actuator arm mount connection expensive to manufacture and to maintain.

SUMMARY

This section provides a general summary of the disclosure, and is not a comprehensive disclosure of its full scope or all of its features.

According to several aspects, a bearing inner race for a solar panel tracker positioning system includes a semi-circular shaped body having a first upper land and an oppositely facing second upper land. A first elongated aperture is positioned proximate to the first upper land and a second elongated aperture is positioned proximate to the second upper land. A first alignment ring is centered within the first elongated through aperture and a second alignment ring is centered within the second elongated through aperture.

According to other aspects, a bearing inner race for a solar panel tracker positioning system includes a semi-circular shaped body having a first upper land and an oppositely facing second upper land. A first elongated aperture is positioned proximate to the first upper land and a second elongated aperture is positioned proximate to the second upper land. A ground stud is integrally connected to the body in an as-cast condition of the body.

According to further aspects, a bearing assembly for a solar panel tracker positioning system includes a bearing inner race. The bearing race includes: a semi-circular shaped body having a first upper land and an oppositely facing second upper land; a first elongated aperture positioned proximate to the first upper land and a second elongated aperture positioned proximate to the second upper land; and a first alignment ring centered within the first elongated through aperture and a second alignment ring centered within the second elongated through aperture. A bearing outer race is fixed to a pile. The bearing inner race is retained by the bearing outer race such that the bearing inner race is rotatable within the bearing outer race.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a front right perspective view of a bearing assembly having a bearing inner race of the present disclosure;

FIG. 6 is a front elevational view of the bearing assembly of FIG. 5.

Corresponding reference numerals indicate corresponding parts throughout the several views of the drawings.

DETAILED DESCRIPTION

Example embodiments will now be described more fully with reference to the accompanying drawings.

Figure 1:
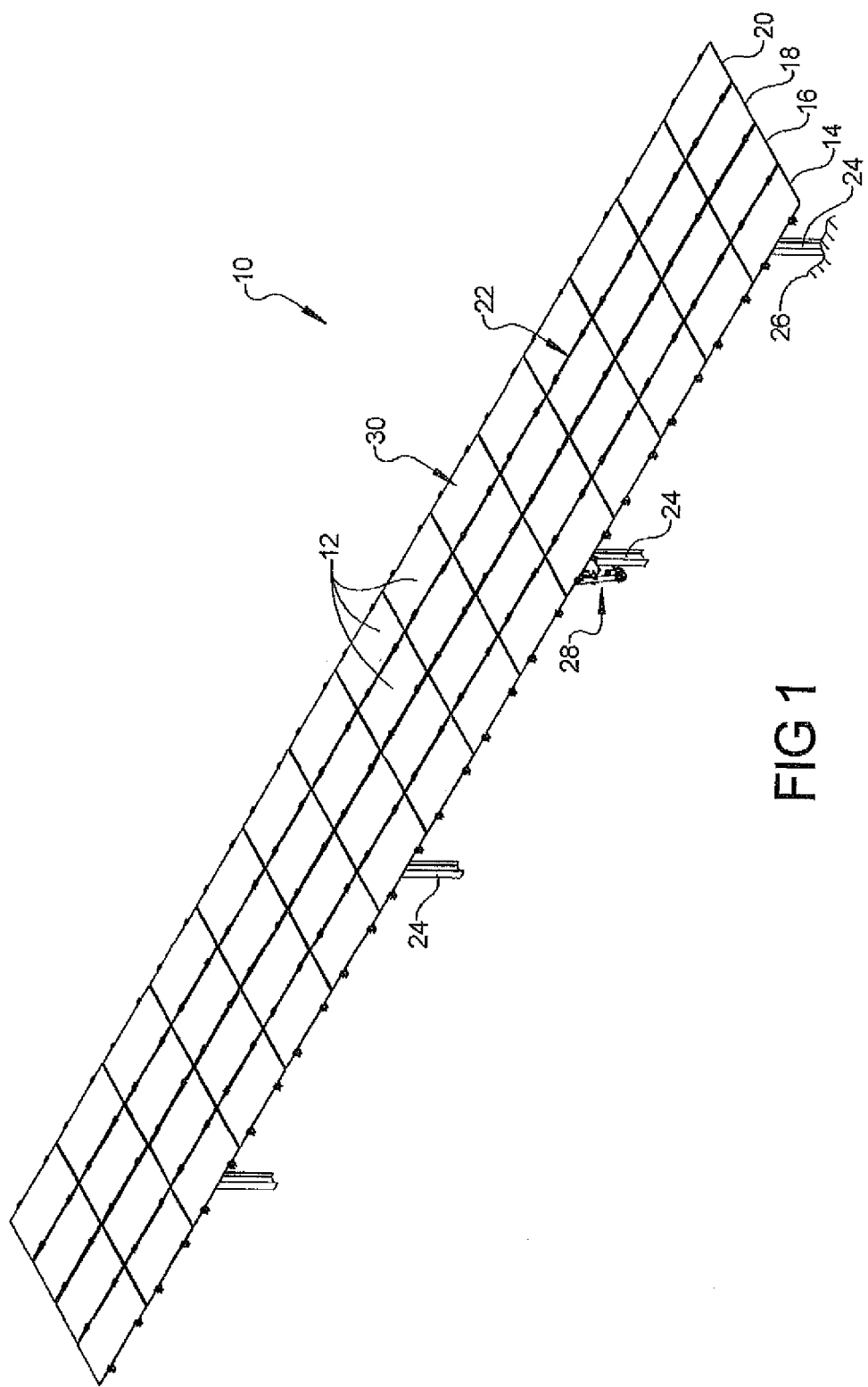
FIG. 1 is a top left perspective view of a solar panel tracker.
Figure 2:
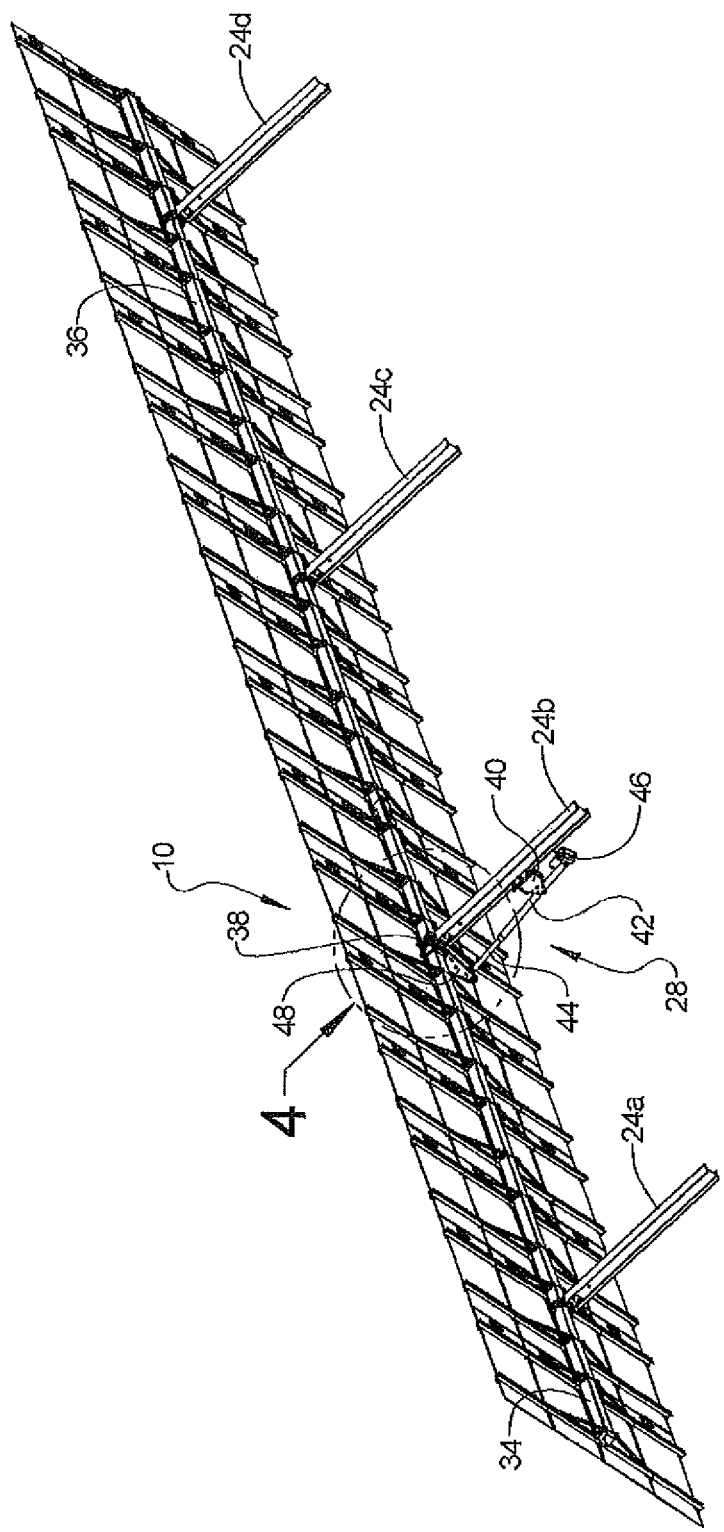
FIG. 2 is a bottom left perspective view of the solar panel tarcker showing a solar tracker positioning system of FIG. 1.

Referring generally to FIGS. 1-2, a solar panel tracking system 10 commonly includes multiple solar panels 12. Multiple, including up to hundreds of solar panel tracking system 10 are combined to create a solar panel field. The solar panels 12 are commonly grouped in rows and/or columns of two, three, four, or six. In the embodiment of FIGS. 1-2, the solar panel tracking system 10 includes first, second, third, and fourth rows of modules 14, 16, 18, 20. The quantity of solar panels 12 in the solar panel tracking system 10 and in each of the rows 14, 16, 18, 20 is not limiting to this disclosure.

Multiple array posts or piles 24 are provided to support each solar panel 12 of the solar panel tracking system 10 at a similar height above a ground surface 26. Each solar panel tracking system 10 includes a tracker orientation control assembly 28 coupled to or adjacent at least one of the support piles 24. The tracker operation control assembly 28 is adapted to change an orientation angle of the solar panel tracking system 10. The orientation of the solar panel tracking system 10 changes with respect to the ground surface 26 to collectively direct each module face 30 of each solar panel 12 toward the sun as a position of the sun with respect to the module face 30 changes over time.

With specific reference to FIG. 2, each of the solar panel trackers 10 are supported on and rotated with respect to at least one and according to several aspects elongated, axially aligned and co-rotated torque tubes 34, 36 which each support a portion of the first, second, third and fourth rows of modules 14, 16, 18, 20. One of the torque tubes 34, 36, in this example first torque tube 34, is directly rotatably connected to an inner one of the piles 24 shown as first, second, third and fourth piles 24a, 24b, 24c, 24d, such as second pile 24b shown. A bearing assembly 38 is connected to the torque tube 34 and to the second pile 24b to permit axial rotation of torque tube 34.

The tracker orientation control assembly 28 includes a mount member 40 fixed to second pile 24b and an actuator arm 42 having an extendable and retractable threaded shaft 44. The threaded shaft 44 extends with respect to the actuator arm 42 by operation of a motor 46. Positioned at an opposite end of the actuator arm 42 with respect to the motor 46 is a pair of side plates defining a plate assembly 48. The plate assembly 48 connects the actuator arm 42 and the threaded shaft 44 to the torque tube 34, such that extension or retraction of the threaded shaft 44 rotates the plate assembly 48 and thereby axially rotates the torque tubes 34, 36.

Referring to FIG. 3 and again to FIGS. 1-2, the actuator arm 42 is rotatably connected by a pin 50 to mount member 40 to allow the actuator arm 42, as well as the plate assembly 48, to rotate during an extension or a retraction of the threaded shaft 44. Rotation of the plate assembly 48 axially rotates the torque tube 34 and the torque tube 36. The torque tubes 34, 36 together rotate with respect to a longitudinal axis 52. Also connected to the tubes 34, 36 are multiple support frames 54 which extend outwardly to provide support for the individual rows 14, 16, 18, and 20 of the solar panels 12.

Figure 3:
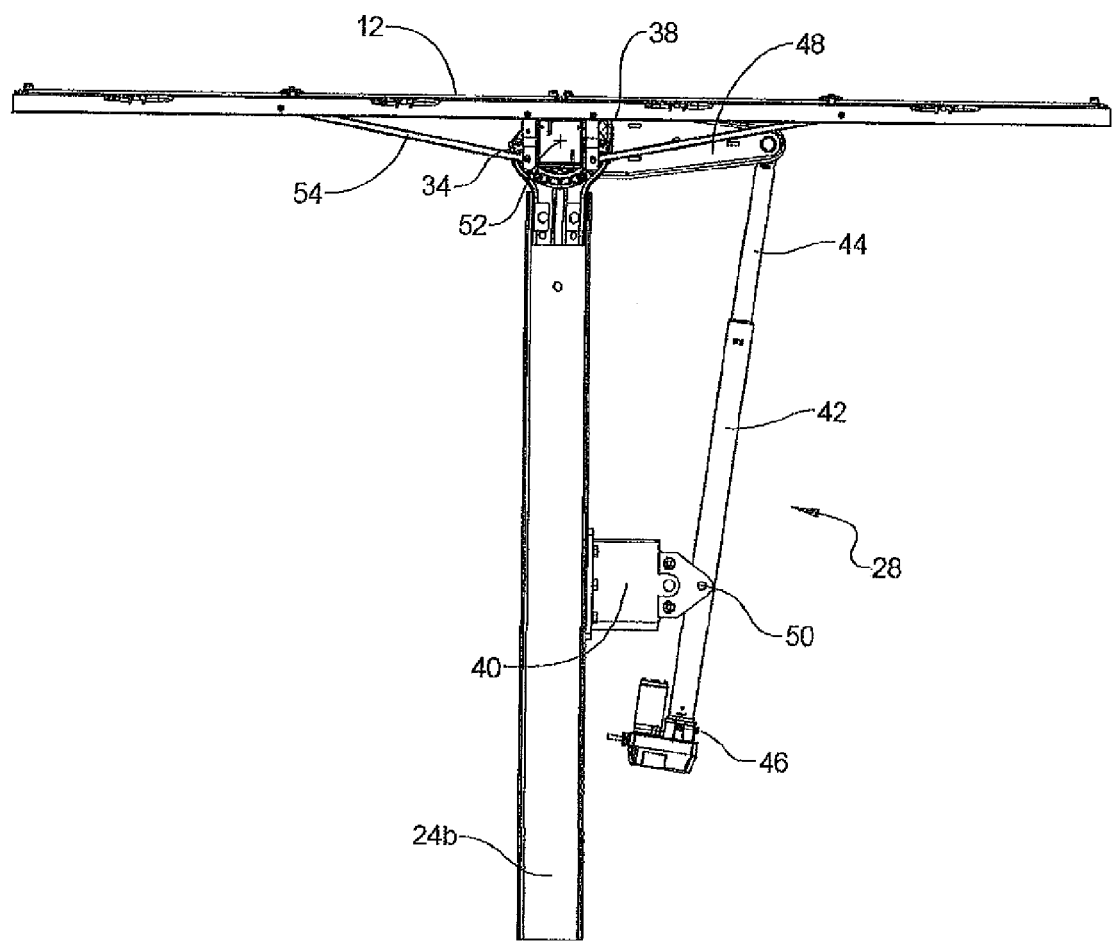
FIG. 3 is an end elevational view of the solar panel tracker of FIG. 1.
Figure 4:
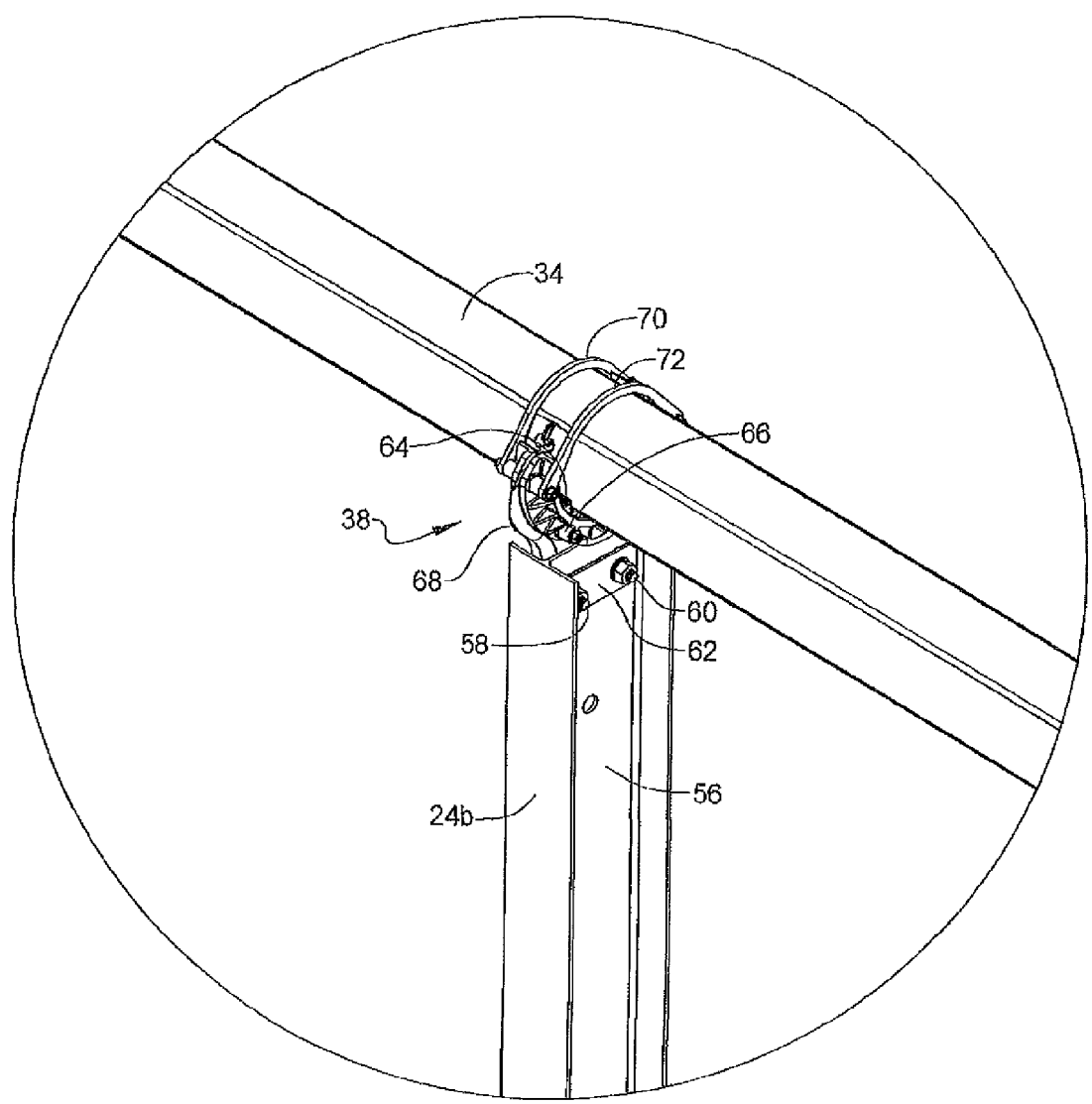
FIG. 4 is a top perspective view of area 4 of FIG. 2 with the solar panels removed for clarity.

Referring to FIG. 4 and again to FIGS. 1-3, each of the piles such as the pile 24b are commonly configured as I-beams, with the bearing assembly 38 connected to a web 56 of the I-beam, for example using first and second fasteners 58, 60 extending through a reinforcement plate 62. It is understood that the pile 24b may have any shape and configuration suitable for supporting the panels 12, as desired. Each bearing assembly 38 includes a bearing inner race 64 which directly contacts and supports the torque tube 34. The bearing inner race 64 is created for example as a casting of aluminum to minimize weight and cost while providing the geometry required, though the bearing inner race 64 may be formed from any suitable material, such as a metal, a plastic, an alloy, a ceramic, or the like. The bearing inner race 64 is supported by and rotates with a molded polymeric material bearing outer race 66. A support leg 68 connected to the bearing outer race 66 is sized to fit between the flanges of the I-beam of the pile such as pile 24b, and is fastened to the web 56 using first and second fasteners 58, 62. The support leg 68 may have any shape that corresponds to and/or cooperates with a corresponding pile 24 for attachment thereto. Curved first and second retaining arms 70, 72 (the retaining arms 70, 72 may also be known as a bearing retention strap) rotatably connected to the bearing outer race 66 extend over the top of the torque tube 34 and are fastened to an opposite side of the bearing outer race 66. The first and second retaining arms 70, 72 hold the torque tube in place such that the lifting of the solar panel track system 10 caused by wind forces, and the like, are minimized.

Referring to FIG. 5 and again to FIGS. 1-4, each bearing assembly 38 includes a first arm fastener 74 which extends through opposed outwardly facing wings 76, 78 of the bearing outer race 66. The first arm fastener 74 defines an axis of rotation of the first and the second retaining arms 70, 72. A second arm fastener 80 is positioned at an opposite end of the first and the second retaining arms 70, 72 with respect to the first arm fastener 74 and extends through both the first and second retaining arms 70, 72 to releasably fix a position of the first and second retaining arms 70, 72. A rib 82 is integrally connected to bearing inner race 64 and extends outwardly. The rib 82 is slidably received in a clearance gap between the wings 76, 78 of the bearing outer race 66. The rib 82 facilitates the axial rotation of the bearing inner race 64 with respect to the fixed bearing outer race 66. Apertures 84 created in a lower extending portion of the support leg 68 receive fasteners such as the first and the second fasteners 58, 60 to attach the bearing assembly 38 to the web 56 of the pile, such as the pile 24b.

Referring to FIG. 6 and again to FIGS. 1-5, opposed first and second upper lands 86, 88 are provided with the bearing inner race 64. A clearance gap 90 is defined between the upper lands 86, 88 sized to allow the torque tube such as first torque tube 34 to be slidably received in a downward direction "D" into the bearing inner race 64. The bearing inner race 64 also includes opposed first and second seat members 92, 94 which directly support the weight of the torque tube 34 within the bearing inner race 64. As shown in FIG. 6, the seat members 92, 94 have an L-shape, but the seat members 92, 94 may have any shape suitable for receiving the torque tube 34 and supporting the weight thereof.

Figure 7:
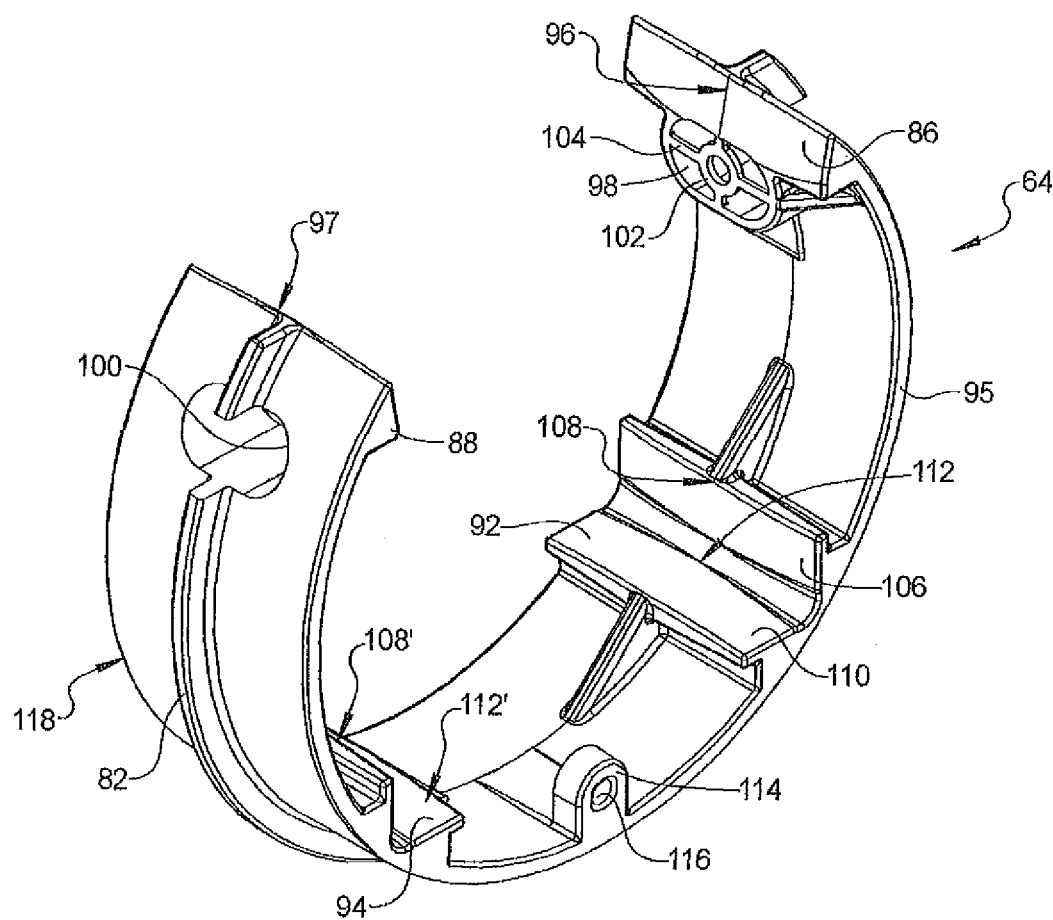
FIG. 7 is a front right perspective view of a bearing race of the present disclosure.

Referring to FIG. 7 and again to FIGS. 1-6, the bearing inner race 64 can be made as a cast aluminum part which is allowed to freely slide and thereby to rotate with respect to the bearing outer race 66 as the torque tube 34 rotates. The bearing inner race 64 has a semi-circular shaped body 95. A convex shaped curved surface 96 is provided with the first upper land 86, and a similar but oppositely-facing convex shaped curved surface 97 is provided with the second upper land 88. It is understand that the lands 86, 88 may be concave, substantially flat, or another shape, as desired. According to several aspects, the curved surfaces 96, 97 have a maximum height of the curved surfaces 96, 97 occurs approximately at a mid-span of the curved surfaces 96, 97. The inwardly curving surfaces 96, 97 accommodate up to approximately 3 degrees of twist of the piles while maintaining axial alignment of the torque tubes 34, 36. It is understood that the degree of axial twist accommodated may be more or less than 3 degrees, as desired.

Positioned proximate to the first upper land 86 is a first through aperture 98 and positioned proximate to the second upper lands 88 is a second through aperture 100. The through apertures 98, 100 have an ovular shape, but the apertures may have a circular or a rectilinear shape or another shape, as desired. Each of the first and second through apertures 98, 100 includes an alignment ring 102 centered within the respective through aperture 98, 100. Each alignment ring 102 is supported in the initial as-cast condition of the bearing inner race 64 by a frangible cross-member 104 which is integrally connected to an inner wall of the first and the second through apertures 98, 100 and to the alignment ring 102. Each cross-member 104 may have side-to-side and top-to-bottom directed elements as shown, or can have only one of the side-to-side or the top-to-bottom directed elements. When one of the torque tubes 34, 36 is received in the bearing inner race 64, the alignment rings 102 provide a centering position for a drill bit to drill an aperture through the outward facing walls of the torque tube 34, 36, such that a fastener (not shown) can be threadably engaged to the torque tube 34 and extend partially into each of the through apertures 98, 100 at a mid-position of the elongated aperture 98 or 100. The elongated geometry of the through apertures 98, 100 shown in FIG. 7 allows limited axial displacement of the torque tube within the bearing inner race 64, with the fasteners displacing up to the extents of the elongated through apertures 98, 100, while the fasteners maintain engagement between the bearing inner race 64 and the torque tube 34. For example, the axial displacement may be ±about 1 inch from the center position.

During installation, each of the piles 24 can be installed with up to about 3 degrees of axial twist and/or about 3 degrees of axial tilt with respect to a nominal vertical installed position. To accommodate this amount of twist and/or tilt, curved surfaces are provided at the land areas where one of the torque tubes 34, 36 contacts the bearing inner race 64. The first and second seat members 92, 94 of the bearing inner race 64 are each L-shaped and each includes an upper bearing 106 having an inwardly directed convex shaped surface 108, 108' and a lower bearing 110 having a convex shaped upwardly directed surface 112, 112'. It is understood that the upper bearing 106 and the lower bearing 110 may have substantially flat surfaces or concave surfaces, as desired. The convex shaped surfaces 108, 108' act similar to the curved surfaces 96, 97 and accommodate up to approximately 3 degrees of axial twist of the piles compared to a nominal orientation while maintaining axial alignment of the torque tubes. The convex shaped upwardly directed surfaces 112, 112' accommodate up to approximately 3 degrees of axial tilt of the piles while maintaining axial alignment of the torque tubes. It is understood that the degree of axial tilt accommodated may be more or less than 3 degrees, as desired. According to several aspects, the convex surfaces 108, 108', 112, 112' each have a radius of curvature of between about 11.25 and about 11.60 inches to provide the desired 3 degrees of axial twist and/or tilt of the piles 24. Positive results have been obtained using convex surfaces 108, 108', 112, 112' each have a radius of curvature of between about 11.25 and about 11.60 inches to provide the desired 3 degrees of axial twist and/or tilt of the piles 24. The radius of curvature is not limiting and can be increased or decreased from the range provided, as necessary.

Inner bearing race 64 also includes an integrally connected ground stud 114. An aperture 116 created through the ground stud 114 provides for fastener engagement of a grounding wire and/connector (not shown) to the ground stud 114. The ground stud 114 thereby provides for secondary electrical grounding of the torque tube 34, 36 and/or bearing assembly 38. The raised rib 82 is integrally connected to the bearing inner race 64, semi-circular in shape, and extends outwardly from a semi-circular shaped outer wall 118 of the body 95 of the bearing inner race 64. The raised rib 82 slides in the slot created between the wings 76, 78 of the bearing outer race 66, described in reference to FIG. 5, to maintain the axial position of bearing inner race 64 when axial loads are applied to the bearing inner race 64 by displacement of the torque tubes 34, 36, caused for example by thermal expansion or contraction, wind forces, and or intentional movement thereof allowed during operation of the solar panel tracking system 10.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element is referred to as being "on," "engaged to," "connected to," or "coupled to" another element, it may be directly on, engaged, connected or coupled to the other element, or intervening elements may be present. In contrast, when an element is referred to as being "directly on," "directly engaged to," "directly connected to," or "directly coupled to" another element, there may be no intervening elements present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bearing inner race for a solar panel tracker positioning system, comprising:
    a semi-circular shaped body having a first upper land and an oppositely facing second upper land, wherein the body includes a clearance gap between the first and second upper lands sized to slidably receive a torque tube supporting at least one solar panel;
    a raised rib directed outwardly from an outer surface of the body and extending substantially along the outer surface of the body except at the first elongated aperture and the second elongated aperture;
    L-shaped, opposed first and second seat members, each having an outer bearing having an inwardly directed convex shaped surface;
    a first elongated aperture positioned proximate to the first upper land and a second elongated aperture positioned proximate to the second upper land; and
    a first alignment ring centered within the first elongated aperture and a second alignment ring centered within the second elongated aperture.

2. The bearing inner race for a solar panel tracker positioning system of claim 1, further comprising a frangible cross-member integrally connected to and centering the first alignment ring within the first elongated aperture, and a frangible cross-member integrally connected to and centering the second alignment ring within the second elongated aperture.

3. The bearing inner race for a solar panel tracker positioning system of claim 2, wherein when the torque tube is received in the bearing inner race, the alignment rings provide a centering position for a drill bit to drill an aperture through the walls of the torque tube received within the inner bearing race, such that a fastener threadably engaged to the torque tube extends partially into one of the elongated apertures at a mid-position of the elongated aperture, the fastener captured within the elongated aperture to limit an axial displacement of the torque tube within the bearing inner race.

4. The bearing inner race for a solar panel tracker positioning system of claim 1, further including a ground stud integrally connected to the body in an as-cast condition of the body.

5. The bearing inner race for a solar panel tracker positioning system of claim 1, wherein each of the first and second seat members includes a lower bearing having a convex shaped upwardly directed surface.

6. The bearing inner race for a solar panel tracker positioning system of claim 5, wherein the inwardly directed convex shaped surface and the convex shaped upwardly directed surface each have a radius of curvature of approximately 11 inches.

7. The bearing inner race for a solar panel tracker positioning system of claim 1, wherein the first upper land and the second upper land each include a convex shaped surface.

8. The bearing inner race for a solar panel tracker positioning system of claim 7, wherein the convex shaped surface has a radius of curvature of approximately 11 inches.

9. A bearing inner race for a solar panel tracker positioning system, comprising:
    a semi-circular shaped body having a first upper land and an oppositely facing second upper land, wherein the body includes a clearance gap between the first and second upper lands sized to slidably receive a torque tube supporting at least one solar panel;
    a raised rib directed outwardly from an outer surface of the body and extending substantially along the outer surface of the body except at the first elongated aperture and the second elongated aperture;
    a convex shaped surface defined by the first upper land and the second upper land;
    L-shaped, opposed first and second seat members each including an upper bearing having an inwardly directed convex shaped surface and a lower bearing having an upwardly directed convex shaped surface, wherein a maximum height of each of the convex shaped surfaces occurs approximately at a mid-span of the convex shaped surfaces;
    a first elongated aperture positioned proximate to the first upper land and a second elongated aperture positioned proximate to the second upper land;
    a first alignment ring centered within the first elongated aperture and a second alignment ring centered within the second elongated aperture; and
    a ground stud integrally connected to the body in an as-cast condition of the body.

10. The bearing inner race for a solar panel tracker positioning system of claim 9, further comprising a frangible cross-member integrally connected to and centering the first alignment ring within the first elongated aperture, and a frangible cross-member integrally connected to and centering the second alignment ring within the second elongated aperture.

11. A bearing assembly for a solar panel tracker positioning system, comprising:
    a bearing inner race, including:
        a semi-circular shaped body having a first upper land and an oppositely facing second upper land, wherein the body further includes a clearance gap between the first and second upper lands sized to slidably receive a torque tube supporting at least one solar panel;
        a raised rib directed outwardly from an outer surface of the body and extending substantially along the outer surface of the body except at the first elongated aperture and the second elongated aperture;
        L-shaped, opposed first and second seat members, each having an outer bearing having an inwardly directed convex shaped surface;
        a first elongated aperture positioned proximate to the first upper land and a second elongated aperture positioned proximate to the second upper land; and
        a first alignment ring centered within the first elongated aperture and a second alignment ring centered within the second elongated aperture; and
    a bearing outer race fixed to a pile, the bearing inner race retained by the bearing outer race such that the bearing inner race is rotatable within the bearing outer race, wherein the raised rib of the bearing inner race is slidably received in a slot created between opposed outwardly facing wings of the bearing outer race.

12. The bearing assembly for a solar panel tracker positioning system of claim 11, further comprising:
    a frangible cross-member integrally connected to and centering the first alignment ring within the first elongated aperture, and a frangible cross-member integrally connected to and centering the second alignment ring within the second elongated aperture; and
    wherein when the torque tube is received in the clearance gap of the bearing inner race, the first and the second alignment rings provide a centering position for a drill bit to drill an aperture through opposed walls of the torque tube, such that a fastener threadably engaged to the torque tube extends partially into one of the first and the second elongated apertures at a mid-position of the elongated aperture, the fastener captured within the elongated aperture to limit an axial displacement of the torque tube within the bearing inner race.

* * * * *